United States Patent [19]

Miller

[11] 4,264,345
[45] Apr. 28, 1981

[54] FILTER HOUSING

[75] Inventor: David L. Miller, Louisville, Ky.

[73] Assignee: American Air Filter Company, Inc., Louisville, Ky.

[21] Appl. No.: 75,173

[22] Filed: Sep. 12, 1979

[51] Int. Cl.³ ............................................ B01D 46/02
[52] U.S. Cl. .................................. 55/341 R; 55/302; 55/378; 55/481; 55/493; 55/504; 55/509; 55/484
[58] Field of Search ............. 55/302, 509, 341 R, 55/341 NT, 341 M, 341 PC, 341 HM, 378, 379, 481, 484, 490, 493, 504, 502; 210/323 T

[56] References Cited

U.S. PATENT DOCUMENTS

| 3,063,224 | 11/1962 | Getzin | 55/493 |
|---|---|---|---|
| 3,360,910 | 1/1968 | Soltis | 55/502 |
| 3,486,310 | 12/1969 | Nilsson | 55/378 |
| 3,513,638 | 5/1970 | Young | 55/341 R |
| 3,581,478 | 6/1971 | Smith | 55/484 |
| 3,630,008 | 12/1971 | Revell et al. | 55/493 |
| 3,726,066 | 4/1973 | Colley et al. | 55/302 |
| 3,788,046 | 1/1974 | Kaeppler et al. | 55/341 R |
| 3,837,150 | 9/1974 | Kubiak | 55/302 |
| 3,951,627 | 4/1976 | Barr, Jr. et al. | 55/341 R |
| 4,158,554 | 6/1979 | Bundy et al. | 55/341 R |

FOREIGN PATENT DOCUMENTS 2396580  3/1979  France ........................ 55/504

Primary Examiner—Bernard Nozick
Attorney, Agent, or Firm—Thomas G. Anderson

[57] ABSTRACT

A filter housing having one or more flow-through media support members releasably secured in the housing between the dirty gas inlet and the clean gas outlet to divide the housing into a dirty gas chamber and a clean gas chamber.

6 Claims, 11 Drawing Figures

FILTER HOUSING

BACKGROUND OF THE INVENTION

1. Field of Invention

The present invention relates to gas separation devices and in particular to a bag house arrangement for filtering particulate material out of a dirty gas stream.

2. Description of the Prior Art

In the typical bag house arrangement, a plurality of tubular filters are supported within the housing of the bag house by an apertured plate or tube sheet extending across the housing. The tube sheet is welded or otherwise appropriately secured to the walls of the housing and divides it into a dirty gas chamber and a clean gas plenum interconnected in flow-through communication by the apertures in the plate; and, a filter is provided for each aperture to filter the gas stream as it flows from the dirty gas chamber into the clean gas plenum. While this type of arrangement generally includes an access door in the wall of the housing to accommodate individual removal and replacement of worn or defective filters, experience has shown that this can be a very messy and time consumming task. This is particularly the case since access into the housing is generally limited such that it is often difficult for a workman to distinguish between defective and servicable filters without removing all of the filters from the housing, one at a time.

SUMMARY OF THE INVENTION

The present invention relates to gas separation devices and in particular to a bag house having one or more removable filter units carrying a plurality of filter elements for filtering out particulate solids in a dirty gas stream.

Each of the filter units includes a flow-through filter media support member releasably secured in the housing of the bag house to divide the housing into a dirty gas chamber and a clean gas chamber. The support members are carried within the housing by a frame extending across the interior of the housing and are releasably secured to the frame by a plurality of clamps which can be manipulated by a workman through an access door in the wall of the housing. Thus, to install a filter unit in the housing, a workman simply aligns the support member of the filter unit along the frame and engages the clamps to secure the support member in sealing engagement with the frame. Conversely, when it is desired to inspect or replace the filter elements in the filter unit, the clamps are disengaged from the support members and the unit is withdrawn from the housing through the access door in the wall of the housing.

From the foregoing, it can be seen that the invention permits rapid repair and replacement of the filter medium in a gas filtration system, it being understood that various changes can be made in the arrangement, form and construction of the apparatus disclosed herein without departing from the scope and spirit of the invention.

DESCRIPTION OF THE PREFERRED EMBODIMENT

Figure 1:
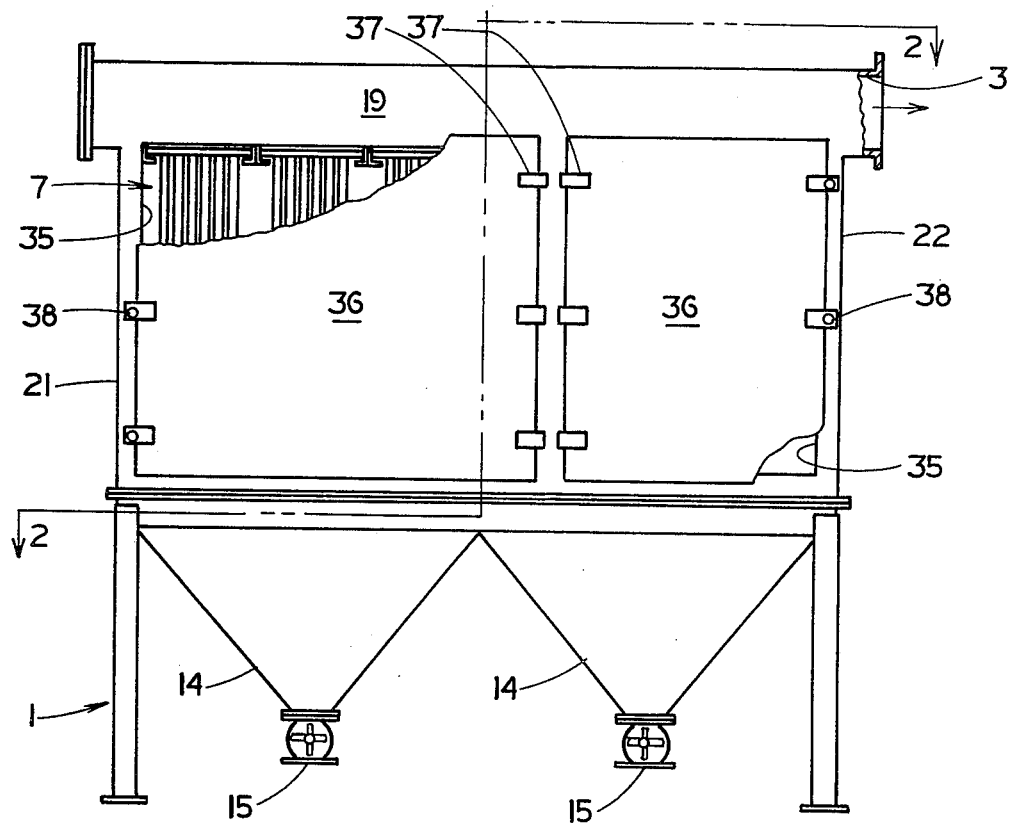
FIG. 1 is a front elevational view of a bag house embodying the invention.
Figure 2:
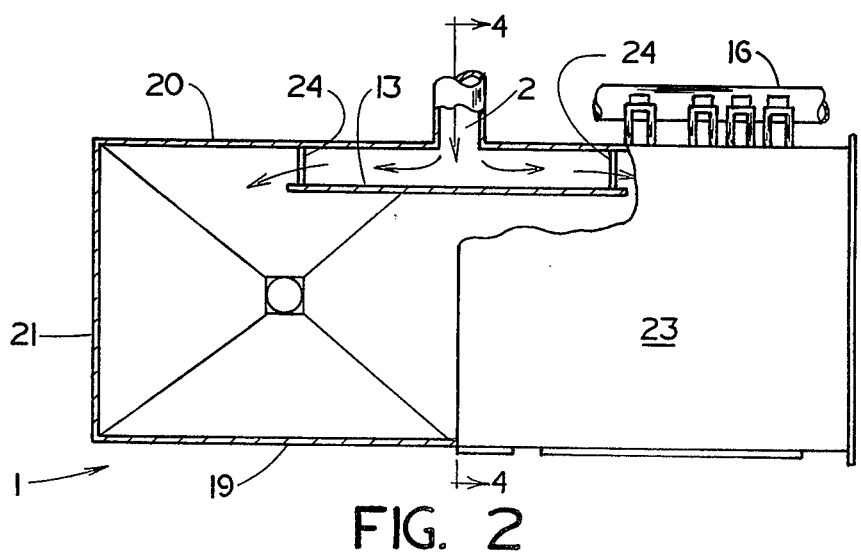
FIG. 2 is a plan sectional view, partially in section, taken generally along line 2—2 in FIG. 1.
Figure 3:
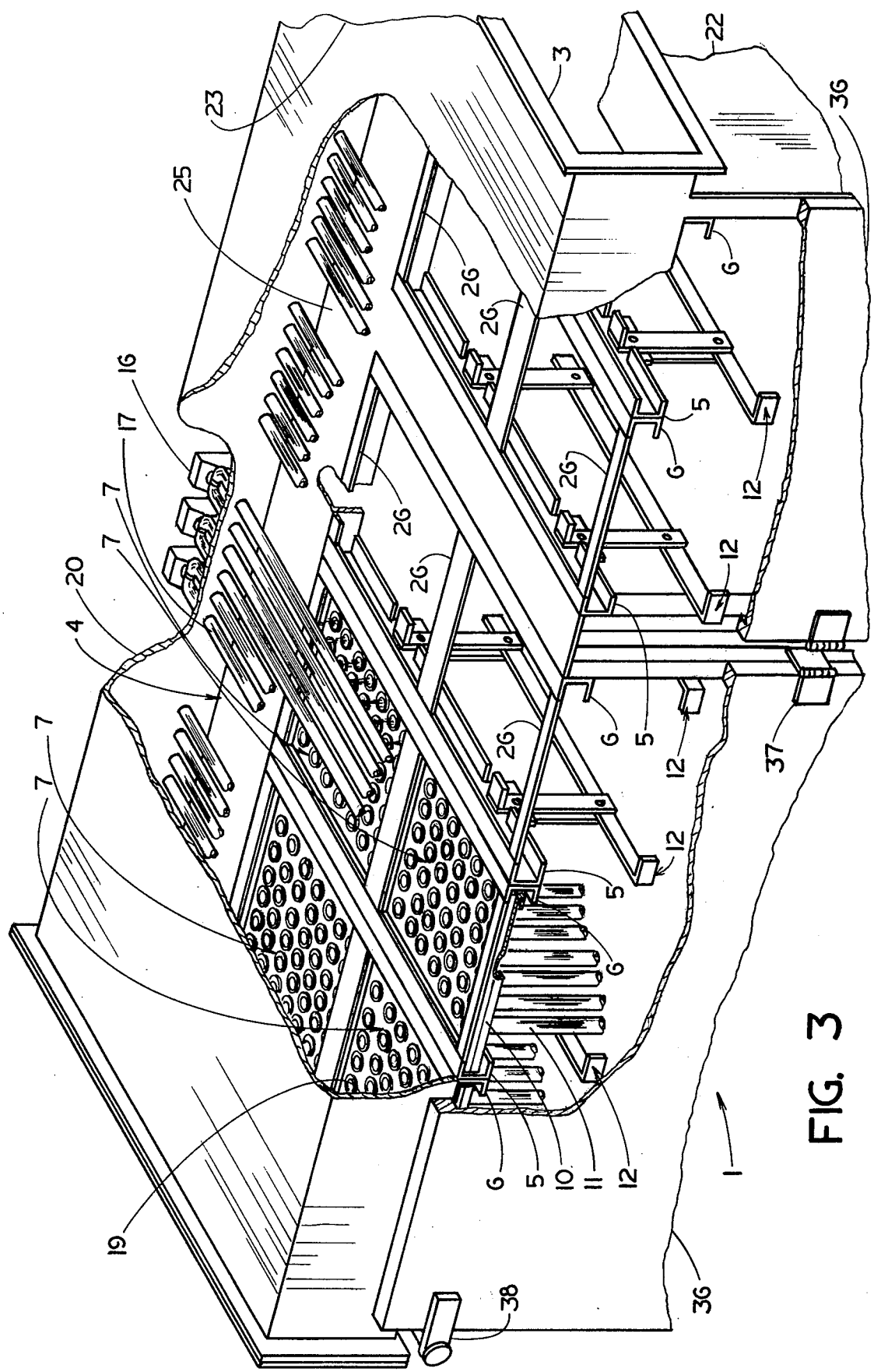
FIG. 3 is an isometric view, partially in section, of the bag house shown in FIG. 1.

Referring to FIGS. 1-7 of the drawings, the gas cleaning system embodying the invention includes a filter housing or bag house 1 having a dirty gas inlet 2 and a clean gas outlet 3. As shown in FIG. 3, the housing includes a transversely extending support frame 4 having a series of opposing parallel channel members 5 and 6 adapted to carry a plurality of removable filter units 7 which divide the housing into a dirty gas cleaning chamber 8 and a clean gas take-off chamber or plenum 9. Each of the filter units 7 includes a filter supporting member or tube sheet 10 which carries a plurality of tubular filters 11 and is releasably inserted between the opposing channel members 5 and 6. As will be described, this arrangement accommodates rapid and convenient removal of the filter supporting members from the housing for repair or replacement of the tubular filters. Thereafter, the supporting members 10 can be easily reinserted and secured between the channel members by clamping linkages 12 mounted on the frame 4.

During gas cleaning operations, dirty gases are directed through the inlet 2 into the dirty gas chamber 8 where they are initially directed downwardly and outwardly by the baffle plate 13 to establish a substantially uniform flow of gases within the chamber. These gases in turn flow upwardly through the filters 11 and out of the housing through the plenum 9 and the clean gas outlet 3. As the gases flow through the housing, particulate materials are separated from the gases on the exterior of each filter and collected in a pair of hoppers 14 positioned below the dirty gas chamber 8, and this material is removed from the hoppers 14 through valved discharge outlets 15. Additionally, to accommodate periodic cleaning of the filters, the housing includes a valve controlled reverse flow flushing arrangement 16. The flushing arrangement includes a plurality of air pulsing pipes 17 having orifaces or nozzles 18 aligned above each of the filters 11 adapted to inject jets or pulses of air into the filters during filter cleaning operations.

The housing 1 is preferably of a welded sheet metal construction having spaced opposed side walls 19 and 20 interconnected by spaced opposed side walls 21 and 22, a roof or top 23, and hoppers 14. As noted above, a rectangular baffle plate 13 is provided adjacent the dirty gas inlet 2 within the dirty gas chamber 8 to direct and stabilize the entrant flow of dirty gases into the chamber. The baffle plate 13, which is generally vertically coextensive with the filters 11 and is substantially centered along the breadth of the housing parallel to the cross-section of the inlet 2, is suppported by posts 24 securing it in spaced relation to the wall 20. This arrangement disperses the entrant flow throughout the dirty gas chamber while also effecting inertial separation of particulate materials from the gases resulting from the relatively abrupt redirection of the flow as it enters the chamber.

As best shown in FIG. 3, each of the opposing channel members 5 and 6 extends across the interior of the housing and is secured to the wall 19 and a closure panel or beam 25 secured along the opposite wall 20. The channel members, which are interconnected by lateral sealing strips or plates 26 to define a series of adjacent rectilinear openings in the support frame 4, are positioned along the width of the housing to provide a series of opposing trackways or slots 27 and 28 which are adapted to slidingly receive and carry a pair of adjacent support members 10 between each pair of opposing channel members. As shown in the drawings, each supporting member 10 is aligned to cover an associated opening in the frame to form a limiting partition separating the dirty gas chamber from the clean gas plenum. In this regard, it should be particularly noted that the support members engage the marginal edges of the frame openings on the upstream side of the frame such that the dirty gases urge the support members into sealing engagement with the frame as a result of the gas pressure drop between the dirty gas chamber and the clean gas plenum.

Figure 6:
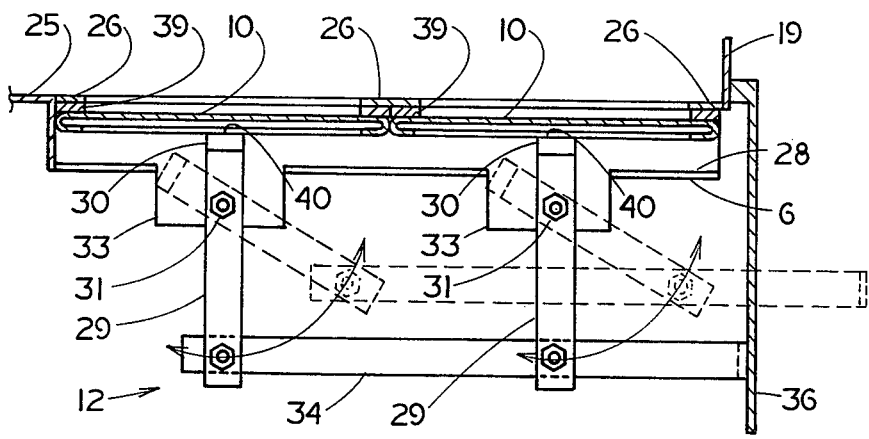
FIG. 6 is a side elevational view, partially in section, showing the clamping arrangement provided to secure the filter unit in the bag house shown in FIGS. 1-4.
Figure 7:
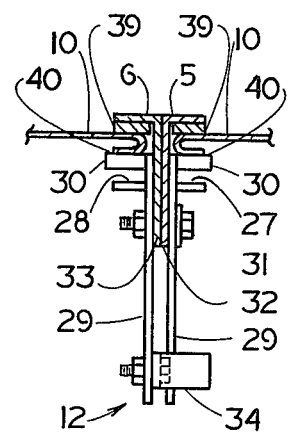
FIG. 7 is an end elevational view, partially in section, of the clamping arrangement shown in FIG. 6.
Figure 4:
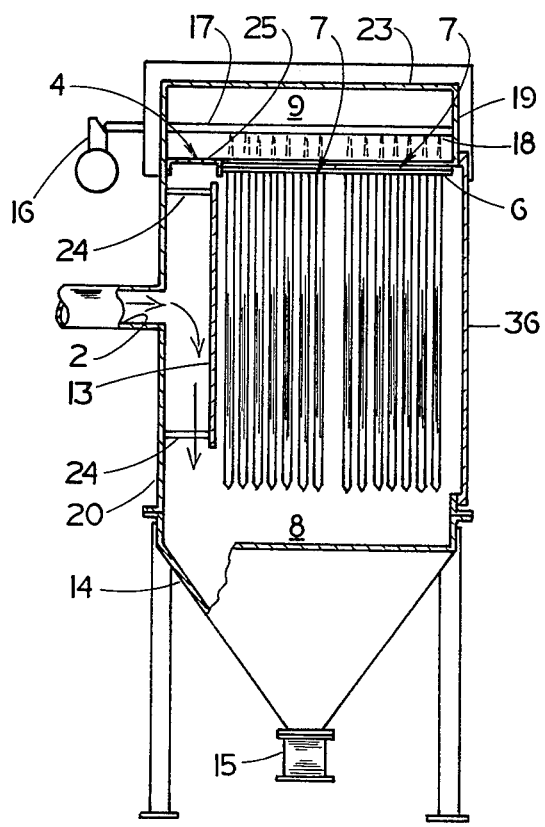
FIG. 4 is a vertical cross-sectional view taken generally along line 4—4 in FIG. 2.
Figure 5:
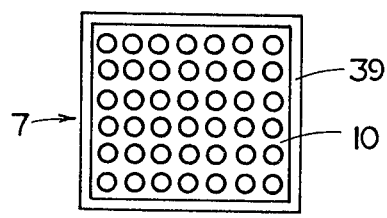
FIG. 5 is a plan view of one of the support members removed from the bag house shown in FIGS. 1-4.

The filter supporting members 10 are secured to the frame 4 by clamping linkages 12 which clamp the marginal edges of the supporting members to the channel members. Each linkage 12 includes a pair of lifting levers 29 having protruding lugs 30 at one end and being pivotally secured by bolts or pins 31 to flanges 32 and 33 depending from the channel members. As shown in FIGS. 6 and 7, the levers 29 are pivotally interconnected by a rigid operating bar or link 34 which can be easily manipulated by a workman through the openings 35 in the wall 19 covered by the doors 36, it being noted that the doors are preferably hung on the wall by hinges 37 or the like and secured in the closed position by conventional latches 38. Thus, when it is desired to replace the filter units, a workman first pulls the operating bars 34 outwardly into the disengaged position generally illustrated by the dotted lines in FIG. 6. In this position, the supporting members are slidably carried on the lower flanges of the channel members such that the filter units can be conveniently withdrawn from the housing through the openings 35. A pair of replacement units are then slid into place between the opposing channel members and the operating bars 34 are pushed back into the housing. This rotates the levers 29 so that the protruding lugs 30 lift the supporting members 10 into sealing engagement with the marginal edges of the respective rectilinear openings in the frame through the compressible gaskets 39 surrounding the periphery of each supporting member. Thereafter, the doors are closed and the system is put back in operation, it being noted that in the clamping position the operating bars 34 abut and are retained in position by the doors. Additionally, since the flat upper surfaces 40 on the protruding lugs 30 lift the supporting members above their final installed positions as the levers 29 are rotated into the clamping position, the clamping linkages cooperate with the compressed gaskets 39 to effect an over-center positive seal between the supporting members and the frame.

FIGS. 8–11 show another embodiment of the invention which is particularly suited for lower volume air filtration requirements such as those required for small rock drills, pneumatic conveying systems used to load comminuted bulk into railway hopper cars, grain silos, and related applications. This embodiment, which is adapted to use the same modular filter unit 7 as the foregoing gas cleaning arrangement, includes an essentially square filter housing 50 having a dirty gas inlet 51 and a clean gas outlet 52. As in the first embodiment, the modular filter unit 7 divides the housing 50 into a dirty gas cleaning chamber 53 and a plenum or clean gas take-off chamber 54. Similarly, when dirty gases enter the dirty gas chamber 53 through the inlet 51, they are directed downwardly and outwardly by the apertured gas diffusing baffle 55 to establish an essentially uniform flow of the gases within the cleaning chamber as they flow upwardly through the filters and leave the housing through the plenum 54 and clean gas outlet 52. Concurrently, particulate materials separated from the gases are collected in the hopper 56 and removed through the valved discharge outlet 57, and the filters are periodically cleaned by the reverse flow flushing arrangement 58 which is substantially the same as that provided in the first embodiment.

Figure 8:
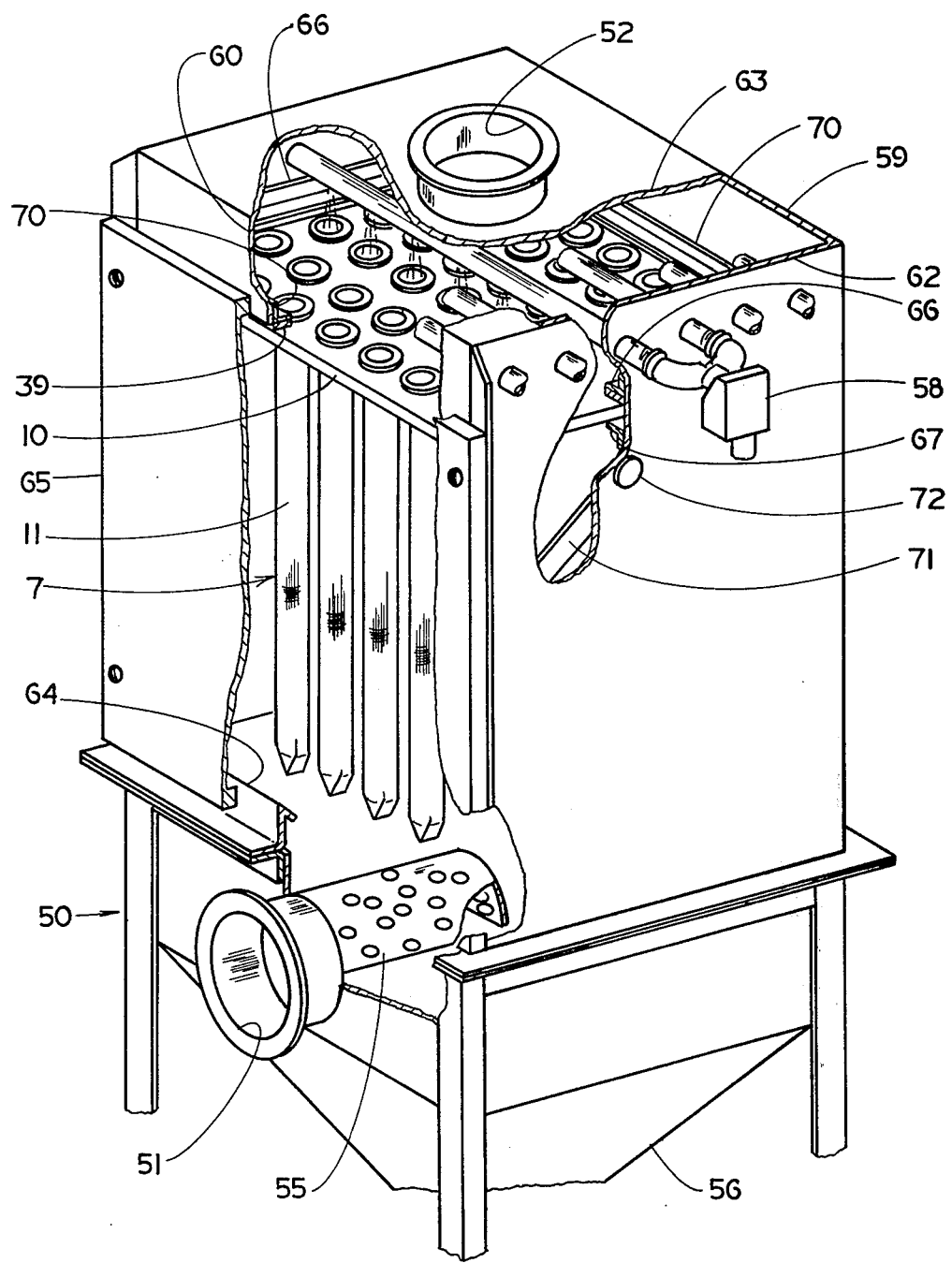
FIG. 8 is an isometric view, partially in section, of another bag house embodying the invention.
Figure 10:
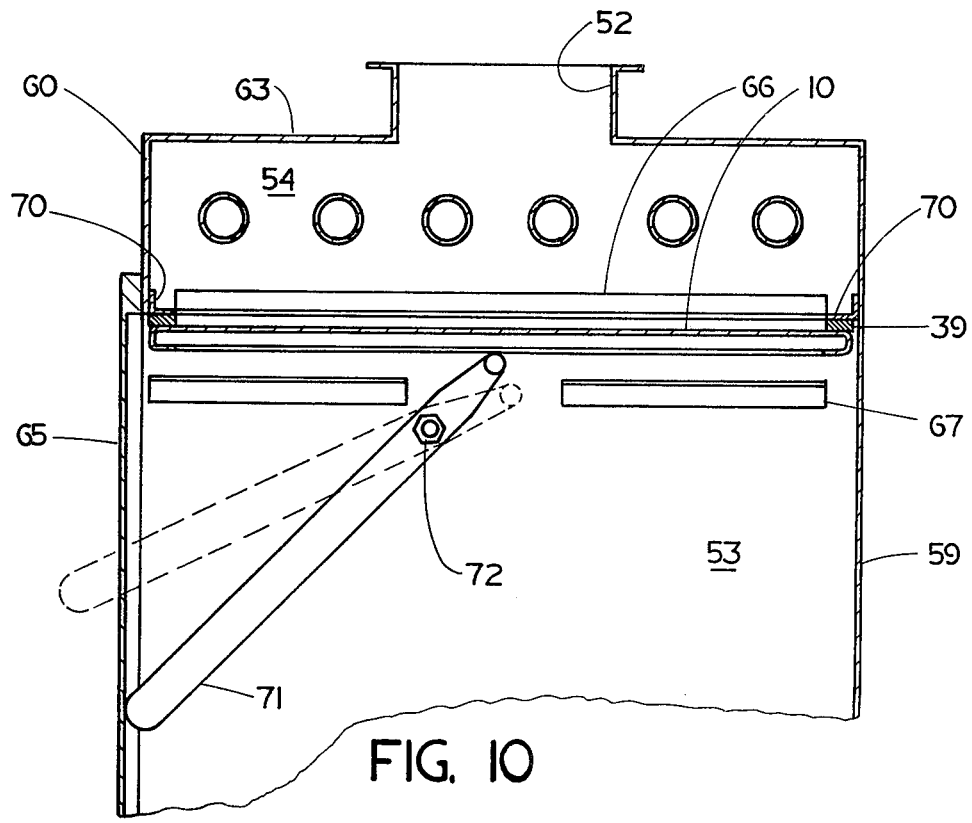
FIG. 10 is a side elevational view, partially in section, showing the clamping arrangement provided to secure the filter unit in the bag house shown in FIGS. 8 and 9.
Figure 11:
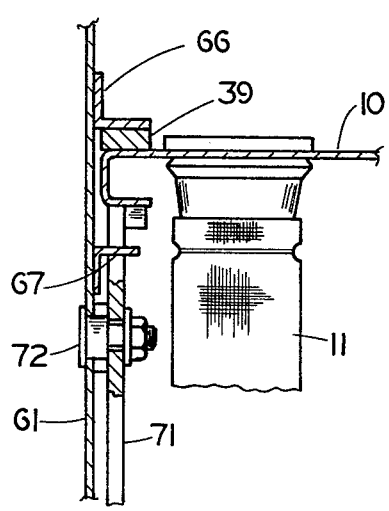
FIG. 11 is an end elevational view, partially in section, of the clamping arrangement shown in FIG. 10.
Figure 9:
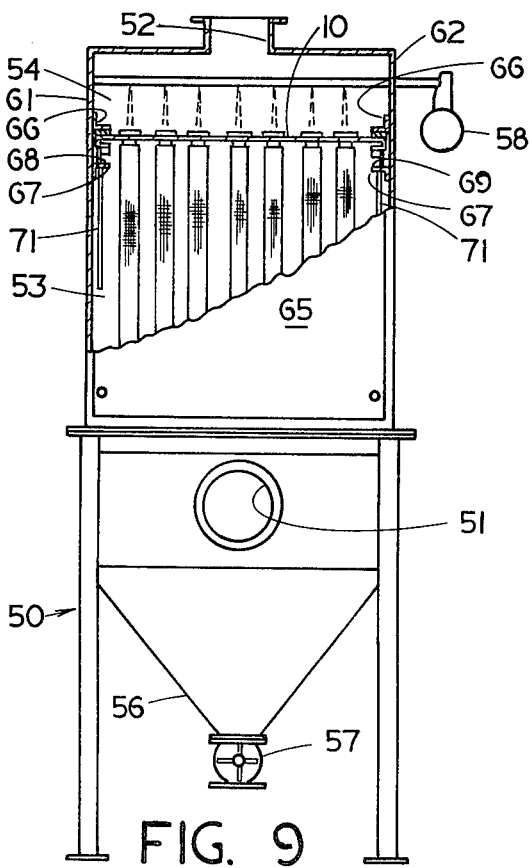
FIG. 9 is a front elevational view, partially in section, of the bag house shown in FIG. 8.

As in the first embodiment, the housing 50 is preferably of a welded sheet metal construction including spaced opposed walls 59 and 60 interconnected by spaced opposed walls 61 and 62, a top or cover 63, and the hopper 56. As shown in FIG. 8, the wall 60 includes an opening 64 covered by a removable door or panel 65 secured by screws or the like to the wall 60. Referring to FIGS. 10 and 11, angle members 66 and 67 are secured to the opposing walls 61 and 62 to define a pair of opposing slots or trackways 68 and 69, and, angle members 70 are secured to the opposing walls 59 and 60 in alignment with the members 66 and 67 to form a sealing surface about the interior periphery of the housing. Thus, as in the first embodiment, the opposing trackways 68 and 69 slidably receive and carry the supporting member 10 to support the filter unit 7 within the housing, and clamping levers 71 pivotally connected to the walls 61 and 62 by pins or bolts 72 secure the unit within the housing.

From the foregoing, it can be seen that when installing a new or replacement unit in the housing 50, the supporting member 10 is first slid into place in the trackways 68 and 69. This rotates the levers 71 into the position generally indicated by the dotted lines in FIG. 10. The levers 71 are then rotated to the clamping position to lift the supporting member 10 into sealing engagement with the angle members 66 and 70 through the gasket 39. Thereafter, the door 65, which retains the levers in the clamping position, is resecured and the system is put back in operation.

I claim:
1. A side access filter housing having a dirty gas inlet and a clean gas outlet;
   a border frame secured about the interior periphery of the housing;
   a removable filter unit releasably disposed in the housing between the dirty gas inlet and the clean gas outlet, said unit including an apertured filter supporting member of a generally plate-like rectilinear configuration covering the marginal edge of the inlet side of the frame to divide the housing into a dirty gas chamber and a clean gas chamber, and a plurality of tubular filter bags depending from the supporting member into the dirty gas chamber;

clamping means releasably securing said filter supporting member to the frame within the housing;

said clamping means including a plurality of levers pivotally connected with said frame;

each lever having an end portion engageable with said supporting member to urge said member into sealing engagement with said frame upon rotation of the lever; and guide means for the filter unit including a pair of opposing trackways extending across the housing proximate the frame, said trackways being sized to receive the opposing marginal edges of the supporting member in sliding supportive relation during installation and removal of the filter unit through the side of the housing.

2. The invention according to claim 1, and baffle means mounted between the dirty gas inlet and the filter tubes adapted to effect a substantially uniform flow of dirty gases throughout the dirty gas chamber.

3. The invention according to claim 1, and said frame being sized relative to the breadth of said supporting member to interchangeably receive a plurality of said members in adjacent side-by-side relation.

4. The invention according to claim 1, and said frame including a plurality of generally channel-shaped members extending across the housing and spaced one from the other to provide a series of said opposing pairs of trackways.

5. The invention according to claim 1, and said end portions being cooperative with said supporting member to releasably retain the levers in over-center locked positions.

6. A side access filter housing having a dirty gas inlet and a clean gas outlet;

a border frame secured about the interior periphery of the housing;

a removable filter unit releasably disposed in the housing between the dirty gas inlet and the clean gas outlet, said unit including an apertured filter supporting member of a generally plate-like rectilinear configuration covering the marginal edge of the inlet side of the frame to divide the housing into a dirty gas chamber and a clean gas chamber, and a plurality of tubular filter bags depending from the supporting member into the dirty gas chamber;

clamping means releasably securing said filter supporting member to the frame within the housing;

said clamping means including a pair of linkages disposed on opposing sides of the supporting member;

said linkages each including a plurality of levers pivotally connected with said frame means and an operating bar pivotally interconnecting the levers for rotation of the levers in concert;

each of said levers having an end portion engageable with said supporting member upon rotation of the levers to urge said members into sealing engagement with said frame; and guide means for the filter unit including a pair of opposing trackways extending across the housing proximate the frame, said trackways being sized to receive the opposing marginal edges of the supporting member in sliding supportive relation during installation and removal of the filter unit through the side of the housing.

* * * * *